United States Patent [19]

Sage

[11] 4,355,569

[45] Oct. 26, 1982

[54] ROTARY HOT DOG COOKER

[76] Inventor: Thomas L. Sage, 21319 Castillo St., Woodland Hills, Calif. 91364

[21] Appl. No.: 209,549

[22] Filed: Nov. 24, 1980

[51] Int. Cl.³ .............................................. A47J 43/18
[52] U.S. Cl. ...................................... 99/427; 99/339; 99/441; 99/443 R; 99/446; 99/447; 99/448; 99/450
[58] Field of Search ................ 99/427, 441, 446, 339, 99/447, 448, 450, 421 P, 443 R, 332; 219/389

[56] References Cited

U.S. PATENT DOCUMENTS

| | | | |
|---|---|---|---|
| 1,787,469 | 1/1931 | Blier | 99/441 |
| 1,870,476 | 8/1932 | Babcock | 99/441 |
| 2,125,965 | 8/1938 | Sturm | 99/332 |
| 2,310,349 | 2/1943 | Bobo | 99/441 |
| 2,549,019 | 4/1951 | Saunders | 99/421 P |
| 2,775,189 | 12/1956 | Scholl | 99/441 |
| 2,828,686 | 4/1958 | Nelems | 99/441 |
| 3,196,776 | 7/1965 | Norton | 99/421 P |
| 3,643,588 | 2/1972 | Schwarz | 99/427 |
| 3,657,995 | 4/1972 | Adamitis | 99/441 |
| 3,782,268 | 1/1974 | Navarro | 99/421 P |

FOREIGN PATENT DOCUMENTS 2358119 11/1972 Fed. Rep. of Germany ........ 99/427

1265159 5/1961 France ..................... 99/421 P

*Primary Examiner*—Billy J. Wilhite
*Attorney, Agent, or Firm*—Robert R. Keegan

[57] ABSTRACT

There is disclosed an electric hot dog cooker also suitable for cooking individual portions of sausages, shish-kabob or the like, including a stand supporting an electric heating coil in the form of a helix extending horizontally; inside the helical heating coil is a hollow bushing member arranged so that a rotisserie spit rod will extend through the bushing and engage a rotisserie motor element, all essentially co-axial with the helical electric heating element. Secured only to the outer end of the rotisserie spit is a circular arrangement of nine cylindrical open-wire cages about two inches in diameter and about nine inches long, capable of accepting a hot dog, sausage or similar shaped food portion and large enough so that the hot dog will roll in the cage while the circular arrangement of cages is rotated around the heating coil by the rotisserie motor. The motor is shielded from the heating element by a metal shield having a horizontal turned-down portion at the top thereof serving as a warming shelf. An optional cylindrical shield may be fastened around the circular arrangement of cages to reflect heat and conserve energy. The heat level is adjustable electrically.

8 Claims, 5 Drawing Figures

ROTARY HOT DOG COOKER

The present invention relates to cookers for hot dogs and in particular those which the cooker has a place for a number of hot dogs and these places rotate with respect to a heating source. A number of advantages are provided by applicant's apparatus over previously known hot dog cookers of this general type. First of all, applicant's apparatus is very simple, having essentially only one moving part driven by a conventional rotisserie motor and this part can readily be removed and washed by hand or in a dishwasher. Hot dogs can be inserted in the machine one at a time and may be removed one at a time or all together by removing and dumping the carrier unit. It is not necessary to pierce the skin of the frankfurter or hot dog for it to be held in the carrier and thus undesirable loss of meat juices is avoided.

The distinctive arrangement of applicant's apparatus not only provides that the frankfurters be exposed on all sides substantially equally to the heating element, but also causes rotation of the frankfurters to produce a self-basting effect. A shield may be provided around the carrier element to reflect heat back from the central heating coil to provide faster and more efficient cooking of the hot dogs.

Many forms of apparatus have been devised where hot dogs or food portions of similar shape are rotated with respect to a heat source in order that a substantial number of the hot dogs may be cooked uniformly at the same time. In some such apparatus the hot dog is pierced by a prong or probe to hold it in position. This is undesirable because better results are obtained when the hot dog skin is maintained intact. Certain prior apparatus such as shown in U.S. Pat. No. 1,870,476 to Babcock, has a rotating arrangement in the form of merry-go-round type structure where the rotation of the hot dogs is about a vertical axis and the hot dogs are positioned vertically. This is an undesirable arrangement because the hot dogs are not caused to be basted in their juices but rather the meat juices gravitate to the bottom end of the hot dog due to its vertical orientation.

Other apparatus as shown in the U.S. Pat. No. 2,775,189, to Scholl, has a rotating carrier rotating about a horizontal axis but the Scholl apparatus involves a ferris-wheel structure so that the weiner holders do not rotate the weiners. U.S. Pat. No. 2,828,686 to Nelems and also U.S. Pat. No. 3,643,588 to Schwarz, et al, provide rotating carriers for hot dogs or weiners rotating about horizontal axes, but there is no provision for a centrally located heating element and thus the hot dogs are not in close proximity to the heat source for the entirety of their rotation cycle. Furthermore, the patent to Schwarz, et al involves articulated holders for the hot dogs which individually move from an open position to a closed position as the carrier is rotated. This creates a complicated, expensive structure which is difficult to maintain and clean. Other U.S. patents such as Blier, No. 1,787,469; Sturm, No. 2,125,965; Norton, No. 3,196,776; Navarro, No. 3,782,268; French No. 1,265,159, and German No. 2,358,119, are also directed to this problem, but fail to provide the advantages of applicant's apparatus.

In addition to providing the objects and advantages described above, it is an object of the present invention to provide hot dog cooking apparatus for a plurality of hot dogs in which the hot dogs are supported in a carrier rotating about a horizontally disposed central heating element and by which the hot dogs are caused to rotate in their individual holders.

It is another object of the present invention to provide a hot dog cooker with a rotating carrier for a multiplicity of hot dogs wherein the carrier is a single unit which may be readily disconnected from the rotator and removed from the heater element in order that it may be cleaned or washed, either by hand or in an automatic dishwasher.

It is still another object of the present invention to provide a hot dog cooker having a rotating carrier element with a plurality of cages for placement of individual hot dogs wherein the cages cause the hot dog to rotate and provide a self-basting action.

Other objects and advantages of the present invention will be apparent from consideration of the following description in conjunction with the appended drawings in which.

Figure 1:
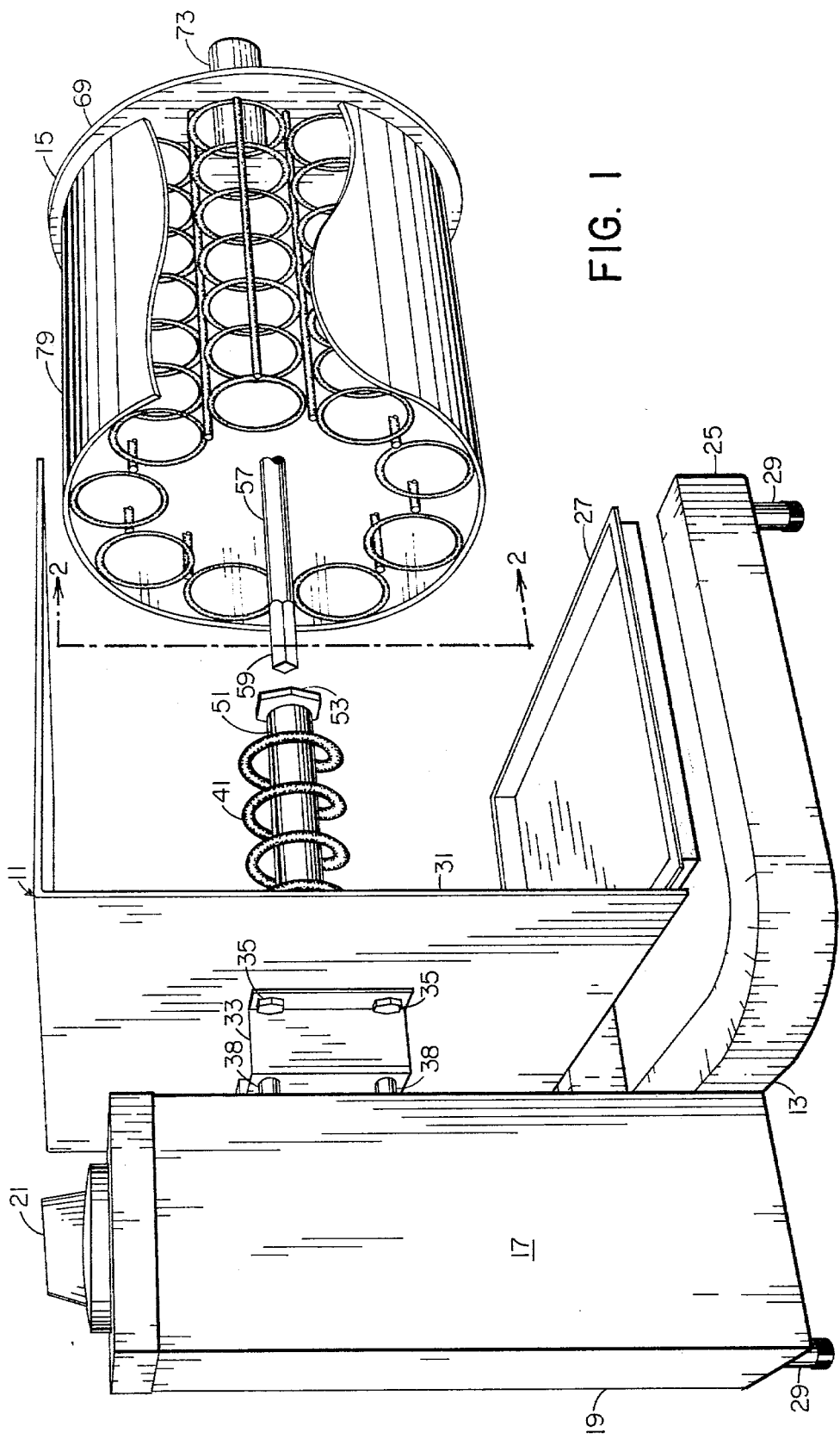
FIG. 1 is a partially fragmentary exploded perspective view of the apparatus according to the invention.

Referring to the drawings and particularly FIG. 1, a hot dog cooker 11 according to the invention, includes a support unit 13 and a carrier 15 which is detachably mountable on the support unit 13.

Figure 5:
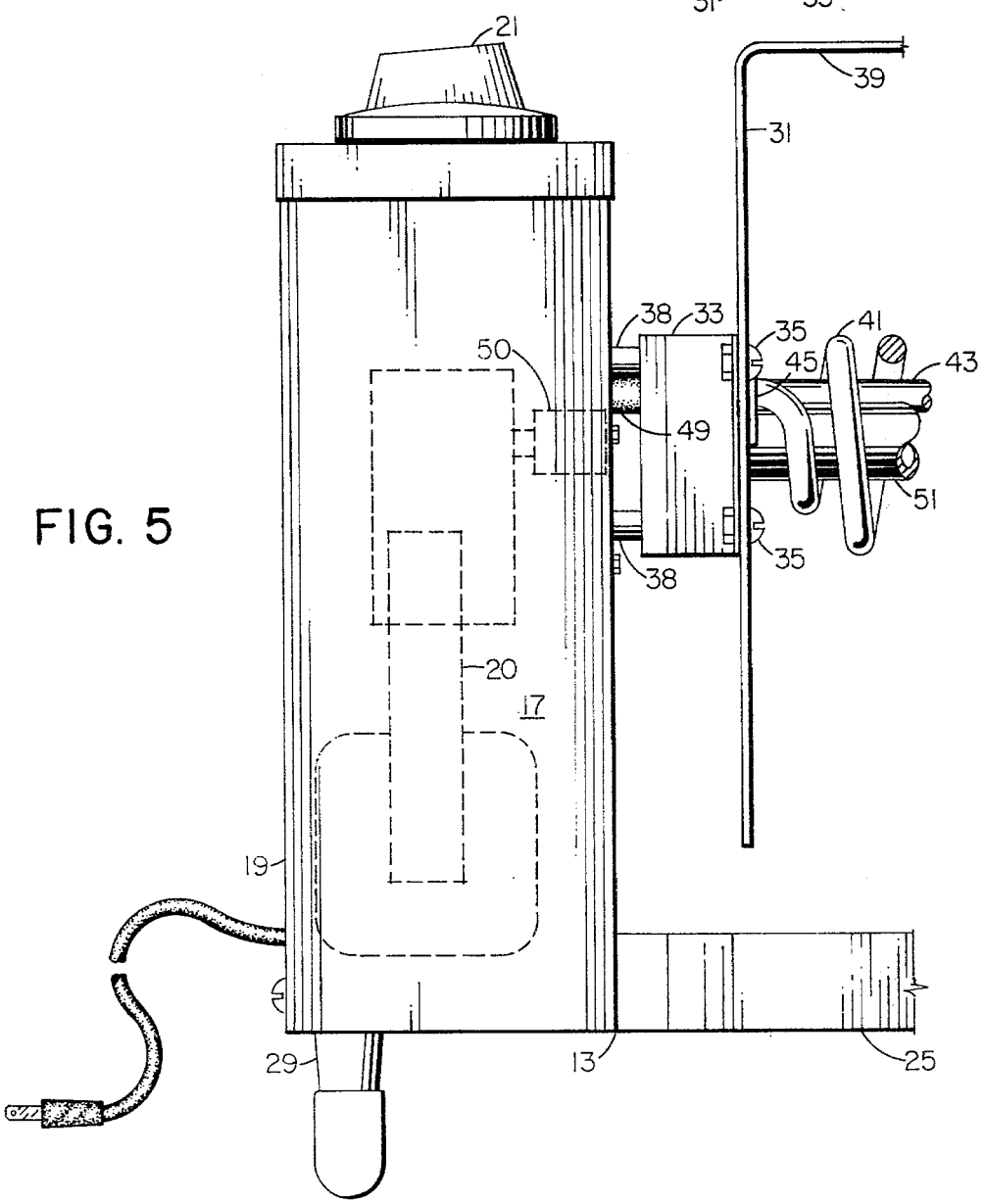
FIG. 5 is a fragmentary front elevational view of the portion of the apparatus shown in FIG. 4.

Embodied in the support unit 13 is a rotator unit 17 having a housing 19 enclosing a conventional rotisserie motor 20 (FIG. 5), and a control arm 21. The rotisserie motor and the heater later to be described may be supplied with electric power through a conventional cord 23 connected to an ordinary household electrical outlet of 120 V and capable of supplying at least 15 amperes.

Support unit 13 has two arms 25 forming a U-shaped space which accommodates a drip pan 27. The entire unit may be supported by three feet, two located at the ends of arms 25 and one at the rear of the housing 19.

Figure 4:
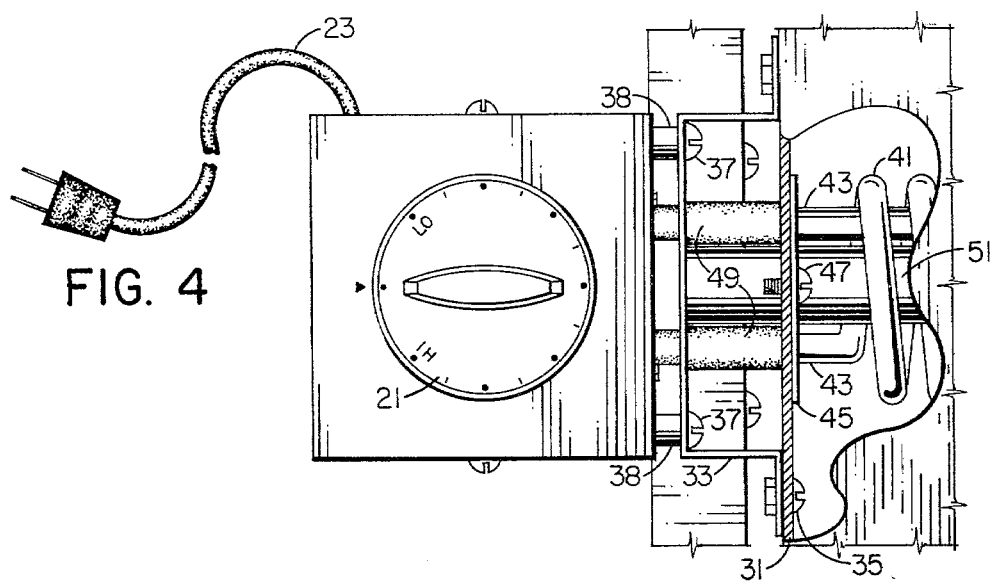
FIG. 4 is a fragmentary top plan view of a portion of the apparatus of FIG. 1.

As best seen in FIG. 4 a shield 31 is secured to rotator element 17 by a bracket 33 and bolts or other suitable fasteners 35 and 37. Heating insulating spacers 38 provide a separation between bracket 33 and housing 19. Bent over from the top portion of shield 31 is a shelf portion 39. As will later be seen shelf portion 39 extends over the heating element of the apparatus and thus may serve as a warming shelf for hot dog rolls or the like.

A helical heating element 41 has leads 43 secured to a mounting plate 45 which in turn fasten to shield 31 by bolt 47. Leads 43 extend through mounting plate 45 and through oversized openings (not shown) in shield 39 and bracket 33, and into housing 17. A conventional thyristor solid state control circuit (not shown) provides a means for varying the power supplied to and thus the heat generated by heating coil 41. Control knob 21 is coupled both to the thyristor solid state power control circuit and also to the switch (not shown) of the rotisserie gear motor 20 (dashed lines in FIG. 5). Motor 20 may operate at a uniform speed for all power settings of the heating coil 41.

Insulating spacers 49 may be provided around leads 43 between shield 39 and bracket 33. Also secured to the mounting plate 45 is a tubular bushing element 51 including a bushing 53 on the end of which supports the carrier 15 for rotational movement as will later be described. Coupling 50 serves to engage motor 20 to carrier 15 as later described.

Figure 2:
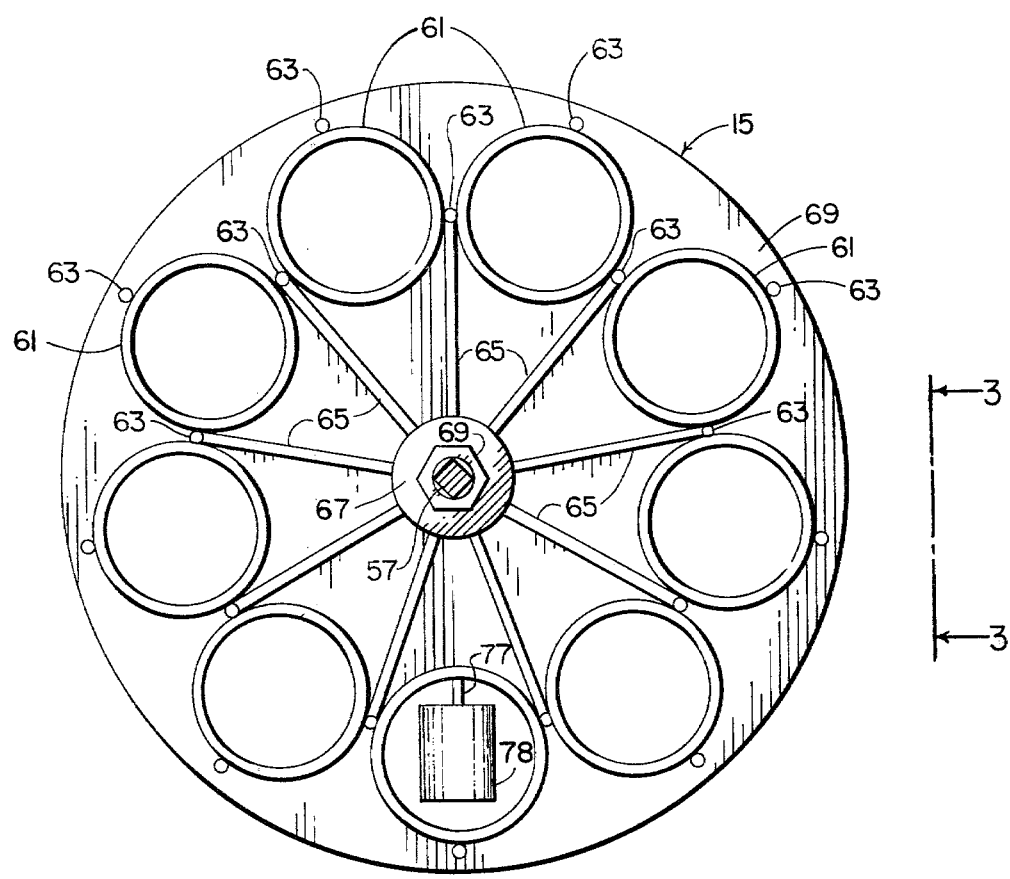
FIG. 2 is a vertical sectional view taken along the line 2—2 in FIG. 1.
Figure 3:
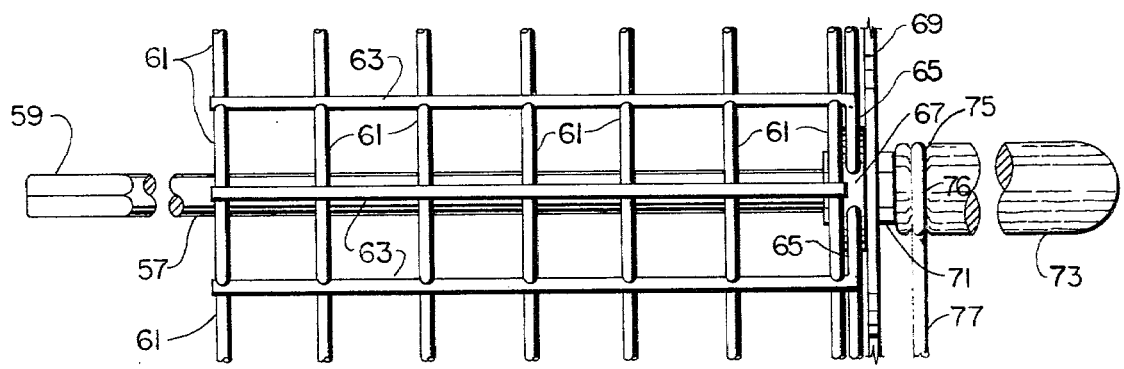
FIG. 3 is a fragmentary view of a portion of the apparatus of FIG. 2 taken along the line 3—3 in FIG. 2.

A detailed structure for carrier 15 by way of illustration is shown in FIGS. 2 and 3 showing rod 57 serving as a shaft about which carrier 15 rotates. Rod 57 has an end 59 of square cross-section which engages the opening of similar shape in the coupling element 50 in the manner of a barbecue spit. The carrier 15 has a plurality of metal rings 61 which are assembled by welding, brazing or other suitable procedure to stringers 63 forming a plurality of cages arranged in a circle. The stringers 63 have end portions 65 (see FIG. 2) which are bent to form radial spokes and are secured to a hub 67.

Hub 67 is secured on the end of rod 57 by the threaded engagement of nuts 69 and 71 on suitable threads provided on rod 57. A handle 73 of heat insulating materials such as wood or plastic is threaded or pressed on the end of rod 57. A shield 69 in the form of a disc with openings arranged to match the position of the cages is also secured relative to rod 57 by nut 71. Shield 69 is optional but is found to be useful in reflecting heat back from the radiant heater 41 and at the same time reducing the heating of handle 73.

When carrier 15 is placed in operating position to surround heater 41, the open end of the cages opposite the handle 73 are closely adjacent to the fixed shield 31 and the hot dogs in the cages are prevented from rolling or slipping out of that end of the cages. The other ends of the cages are open, however, and it is found desirable to prevent the hot dogs from rolling out of the handle end of the cages as the carrier 15 rotates. This is accomplished in a simple and effective manner by the bumper weight 78 suspended by wire 77 having a loop 76 resting in a groove 75 in the handle 73. Weight 78 may be a metal cylinder welded or otherwise secured to the end of wire 77. As seen in FIG. 2 and in FIG. 3, the rotation of the carrier 15 will bring the cages periodically adjacent the weight 78. The cylindrical shape of weight 78 will effectively nudge any hot dog back into the cage which in rolling has tended to move out of the handle end of its cage. The bumper weight 78 performs its function without closing the cages around the upper part of the carrier 15 and hot dogs may be removed from these cages while the carrier is in motion by means of conventional tongs.

It is also possible to remove the carrier 15 with or without stopping the motor 20 and all the hot dogs in the carrier may be dumped out of the cages through the openings at the end opposite the handle 73. An optional shield of stainless steel made to enclose the carrier 15 may be provided. The cylindrical shield 79 will tend to restrict the radiant heat to the interior of the carrier 15 and will permit the heater to be set on a lower setting. Shield 79 may be closed by any convenient form of latch such as a luggage latch (not shown).

As an alternative arrangement shield 79 may be replaced by a fixed cylindrical shield slightly larger in diameter than the carrier 15 and fixedly secured to the shield element 31. With such an arrangement the fixed shield may preferably extend only part way around the carrier 15 so that it does not interfere with the drips into the drip pan 27 and has on one side an opening through which the progress of cooking of the hot dogs may be observed.

In general the operation of the apparatus is apparent from the previous description, but it may be noted that use of the apparatus would proceed by assembling the carrier 15 to the rotator unit 17 by placing rod 57 through bushing element 51 until the end 59 engages coupling element 50. Normally this would be done before loading the carrier 15 with hot dogs. With the carrier 15 in position any number of hot dogs from one to nine may be loaded into the cages of the carrier 15 and the control knob 21 turned to commence rotation of the carrier 15 and to provide the desired level of heat from heater 41. If the shield 79 was being used it would normally be secured to carrier 15 before placing carrier 15 in position. Hot dogs may be removed from the carrier (or placed in the carrier) while it is moving by the use of conventional tongs.

As previously explained the structure and motion of the carrier 15 will cause the hot dogs not only to rotate in a circle about the heater 41, but also to roll and turn on their own axis. The rolling motion of the hot dogs provides a self-basting action which significantly enhances the operation of the apparatus. Bumper weight 78 prevents the hot dogs from working their way out of the end of the cages of the carrier 15.

The structure of the carrier 15 exposes the entire hot dog surface to radiant heat producing a broiling or a barbecuing type of cooking. It should be noted that it is also possible to construct a carrier 15 in which the series of rings 61 forming the cages are replaced by stainless steel cylinders will small perforations or no perforations at all. Such a carrier would shield the hot dogs from the direct radiation of the heater 41 but the hot cylinders of stainless steel would produce a frying action for the hot dogs. Of course such stainless steel cylinders could be provided with larger openings so that the hot dogs were subjected to a combined frying and broiling action. Also, various interchangeable carriers may be provided for the apparatus so that different forms of cooking may be selected for hot dogs or other food portions of similarly elongated shape. The operation of the apparatus may be adapted to the particular use and the speed of cooking and quantity of food portions required. Preferably the control circuit is capable of setting the heater to very low heat whereby already cooked hot dogs may be kept warm for a substantial length of time without overcooking.

In addition to those variations and modifications of the invention described above, other variations and modifications will be apparent to those skilled in the art and accordingly the scope of the invention should not be deemed to be limited to those particular variations described or suggested, but rather should be determined by reference to the appended claims.

What is claimed is:
1. Cooking apparatus comprising
a base,
an elongated heating element,
means for supporting said element in a horizontal position above said base,
a carrier unit adapted to extend lengthwise of said heating element and having a central rod with first and second ends and a plurality of hot dog holders in the form of elongated hollow cages rigidly supported from the second end of said rod in a circular array with axes of said cages parallel to said rod, said cages having a transverse dimension large enough to permit hot dogs to roll therein, said array having an internal diameter greater than that of said heating element and being adapted to sur- round said heating element when in operating position, and a motor driven rotator having a coupling element arranged to be rotated thereby, said rotator being mounted on said base with the axis of rotation of said coupling element extending lengthwise of said heating element and said coupling element being adapted to couple to said first end of said rod to rotate it and the carrier unit.

2. Apparatus as recited in claim 1 further including a fixed elongated bushing and support element arranged lengthwise of said heating element and supporting said rod therein in horizontal position with freedom of rotational movement.

3. Apparatus as recited in claim 1 or 2 wherein said coupling element includes a non-circular opening and the first end of said rod has a cross-section adapted to fit in said opening and be engaged therein for rotational movement with said coupling element.

4. Apparatus as recited in claim 1 or 2 wherein said cages are cylindrical and open at least at one end.

5. Cooking apparatus comprising a base, an elongated helical electric heating element having an axial opening therethrough, means for supporting said element in a horizontal position above said base, an elongated bushing and support unit horizontally mounted above said base extending through said opening, a carrier unit having a central rod with one end adapted to extend through said bushing and support unit, a perpendicular end plate secured to the other end of said rod and at least six hot dog holders in the form of hollow cylinders supported from said end plate and arranged in a circular array with the axes of said cylinders parallel to said rod, said array having an internal diameter substantially greater than that of said heating element, and an electric motor driven rotator with a coupling element, said rotator being mounted with said coupling element coaxial with the opening in said heating element and being adapted to couple to the end of said rod to rotate it and the carrier unit when said rod is placed through said opening.

6. Apparatus as recited in claim 5 wherein said cylinders have the form of wire cages.

7. Cooking apparatus comprising a base, an elongated heating element having an axial opening therethrough, means for supporting said element in a horizontal position above said base, a carrier unit having a central rod with a first end adapted to extend through the opening in said heating element and a plurality of hot dog holders in the form of elongated cylindrical cages supported from the other end of said rod in a circular array with axes of said cages parallel to said rod, said array having an internal diameter substantially greater than that of said heating element, a fixed bushing element arranged coaxially with said heating element and adapted to support said rod therein in horizontal position with freedom of rotational movement, and a rotator having a coupling element arranged to be rotated thereby, said rotator being mounted on said base with its shaft coaxial with the axis of said heating element and being adapted to couple to said first end of said rod to rotate it and the carrier unit when said rod is placed through said opening.

8. Apparatus as recited in claim 7 wherein said coupling element includes a non-circular opening and the first end of said rod has a cross-section adapted to fit in said opening and be engaged therein for rotational movement with said coupling element.

* * * * *